US009981764B2

(12) United States Patent
Higley

(10) Patent No.: US 9,981,764 B2
(45) Date of Patent: May 29, 2018

(54) EASY TO REMOVE BAG HOLDER

(71) Applicant: Evette Higley, Herriman, UT (US)

(72) Inventor: Evette Higley, Herriman, UT (US)

( * ) Notice: Subject to any disclaimer, the term of this patent is extended or adjusted under 35 U.S.C. 154(b) by 0 days. days.

(21) Appl. No.: 15/605,865

(22) Filed: May 25, 2017

(65) Prior Publication Data

US 2017/0361969 A1 Dec. 21, 2017

Related U.S. Application Data

(60) Provisional application No. 62/350,436, filed on Jun. 15, 2016.

(51) Int. Cl.
*B65B 67/12* (2006.01)
*F16M 11/22* (2006.01)
*B65F 1/14* (2006.01)

(52) U.S. Cl.
CPC ...... *B65B 67/1233* (2013.01); *B65B 67/1205* (2013.01); *B65B 67/1238* (2013.01); *B65F 1/1415* (2013.01); *F16M 11/22* (2013.01)

(58) Field of Classification Search
CPC ............ B65B 67/1233; B65B 67/1205; B65B 67/1238; B65B 67/00; B65B 67/12; B65F 1/1415; F16M 11/22
USPC .............................................. 248/97, 99–101
See application file for complete search history.

(56) References Cited

U.S. PATENT DOCUMENTS 1,238,142 A * 8/1917 Hitchcock ............... F24B 1/205 126/29
1,849,472 A * 3/1932 Benedict .................. B65D 7/26 220/485
4,157,801 A * 6/1979 Elmer ..................... B65B 67/12 248/101
4,273,167 A 6/1981 Stillwell
4,457,483 A 7/1984 Gagne
4,632,138 A * 12/1986 Irwin .................... E04H 15/001 135/143
4,643,380 A * 2/1987 Copeland .................. B65F 1/00 141/316
4,948,075 A * 8/1990 Allen ...................... B65B 67/12 248/175
5,163,278 A * 11/1992 Martenhoff ............ A01D 51/00 56/202
5,411,229 A * 5/1995 Hoefkes .............. B65B 67/1205 248/101
5,775,649 A 7/1998 O-Leary
5,887,748 A * 3/1999 Nguyen .................... B65F 1/06 220/495.08
5,897,084 A * 4/1999 Judge .................. B65B 67/1205 141/390
6,199,802 B1 3/2001 Scheibe, Sr.
6,253,949 B1 * 7/2001 Dickson .................... B65F 1/06 220/495.04
6,293,505 B1 * 9/2001 Fan ......................... B65B 67/12 141/391
6,305,396 B1 * 10/2001 Zheng ...................... A63B 9/00 135/115

(Continued)

*Primary Examiner* — Nkeisha Smith
(74) *Attorney, Agent, or Firm* — Amy Fiene; James Sonntag

(57) ABSTRACT

A foldable stand includes four panels attached flexibly at lateral edges such that the panels can be folded in a closed configuration flat upon each other or folded into an open configuration to form a self-supporting free-standing stand.

15 Claims, 32 Drawing Sheets

(56) References Cited

U.S. PATENT DOCUMENTS

| | | | | |
|---|---|---|---|---|
| 6,450,461 | B1 * | 9/2002 | Lohmann | B65B 67/1238 248/97 |
| 6,467,735 | B1 * | 10/2002 | Clinton | B65B 67/12 248/153 |
| 6,851,439 | B2 * | 2/2005 | Zheng | A63B 9/00 135/117 |
| 6,994,301 | B1 * | 2/2006 | Fox | B65B 67/1205 211/85.15 |
| 7,284,732 | B1 * | 10/2007 | Lopa | B65B 67/1233 248/101 |
| 7,736,057 | B2 * | 6/2010 | Vanbost | B65B 67/04 141/114 |
| 7,845,507 | B2 * | 12/2010 | Kellogg | D06F 95/002 220/6 |
| 7,913,871 | B2 * | 3/2011 | Fisher | B65F 1/06 220/495.06 |
| 8,342,461 | B2 * | 1/2013 | Sutphen | B65F 1/06 220/212 |
| 2006/0144467 | A1 * | 7/2006 | Butzer | B65B 67/04 141/391 |
| 2006/0231692 | A1 * | 10/2006 | Sabounjian | A45C 7/0063 248/95 |
| 2007/0045484 | A1 * | 3/2007 | Tombazzi | B65B 67/1222 248/99 |
| 2007/0079548 | A1 * | 4/2007 | Bakowski | A01G 13/043 47/31 |
| 2008/0191103 | A1 * | 8/2008 | Thurgar | B65F 1/06 248/101 |

* cited by examiner

EASY TO REMOVE BAG HOLDER

BACKGROUND

Bags and other types of containers find many everyday uses. For example, bags may be used to hold laundry, garbage, waste, groceries, games, and many other items. Bags may be loose or held upright in a container, such as a garbage bag that is supported by a waste receptacle.

A common problem with bags that are supported by containers occurs when it comes time to lift the bag out of the container. For example, a garbage bag that is packed with refuse may take some extra manpower to unloose the bag from the confines of a container. Other common problems are found, for example, with bags that are tied to a pole or that are hung in the air. For example, bags that are tied to a pole may be difficult to untie. Also, bags that are hung in the air may break and cause contents to spill. Managing the support of bags can require a great deal of effort and time, resulting in frustration and inefficiency.

BRIEF SUMMARY

A foldable stand includes four panels attached flexibly at lateral edges such that the panels can be folded in a closed configuration with panels positioned flat upon each other. The panels are also folded into an open configuration to form a self-supporting free-standing stand. In the open configuration, the panels form surface exteriors that include a top opening formed by tops of the panels and a bottom opening formed by bottoms of the panels. The tops and bottoms of the panels are dimensioned such that the bottom opening is larger than the top opening with the surface exteriors of the stand tapered from the bottom opening narrowing to the top opening.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

This application claims priority from U.S. Provisional Patent Application 62/350,436, filed Jun. 15, 2016, which is hereby incorporated by reference.

Figure 1:
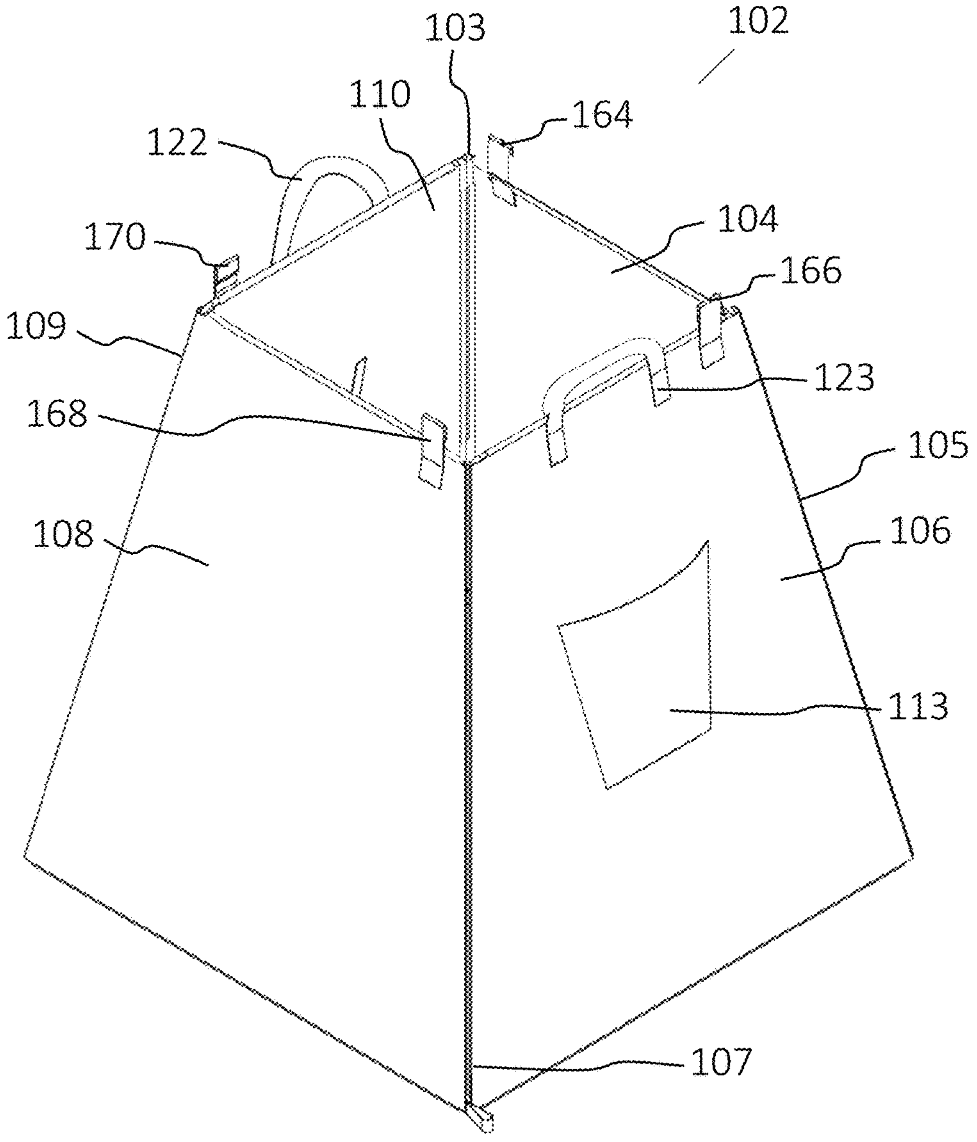
FIG. 1 illustrates a perspective view of a foldable stand.
Figure 1B:
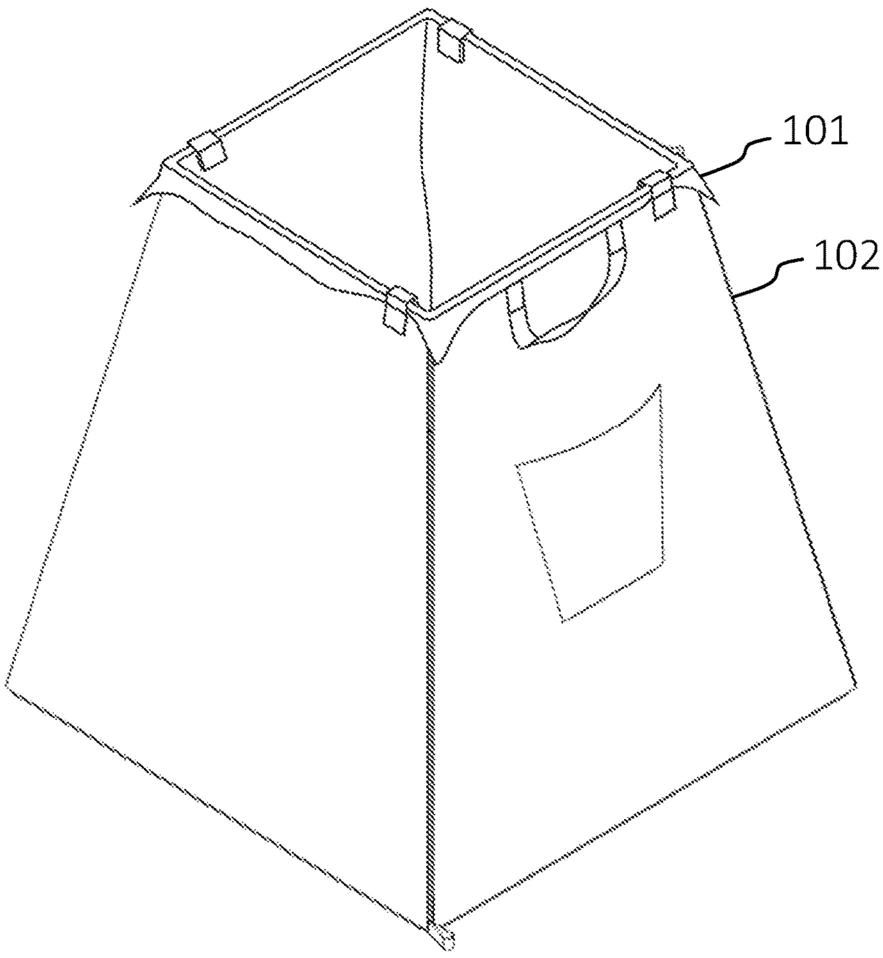
FIG. 1*b* illustrates a garbage bag attached within the foldable stand.
Figure 1C:
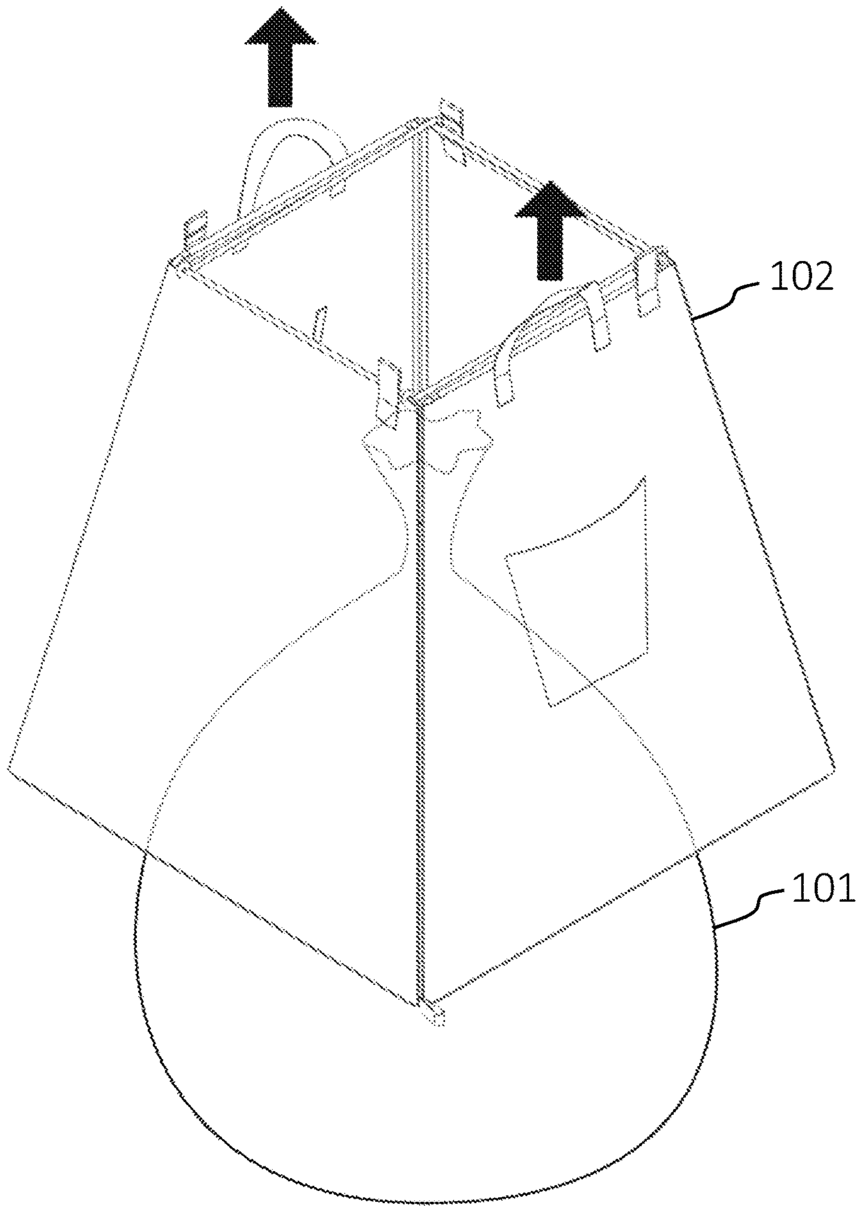
FIG. 1*c* illustrates a foldable stand being lifted up from a garbage bag.

The following describes a foldable stand as shown in FIG. 1. Features of the stand allow it to be quickly and easily separated from a bag simply by lifting the foldable stand vertically upward, or away from, the bag. Other advantages will be readily ascertained. FIG. 1*b* shows a bag in a first position with the bag opened and attached at the top opening and extending toward the bottom. FIG. 1*c* shows a second position with the bag unattached from the top opening and removed from the stand by lifting the stand up off the bag.

The foldable stand includes four panels attached flexibly at lateral edges such that the panels can be folded in a closed configuration flat upon each other. Alternatively, the panels have an open configuration to form a self-supporting free-standing stand. In the open configuration, the panels form surface exteriors that include a top opening formed by tops of the panels and a bottom opening formed by bottoms of the panels. The tops and bottoms of the panels may be dimensioned such that the bottom opening is larger than the top opening with the surface exteriors of the stand tapered from the bottom opening narrowing to the top opening.

Turning to FIG. 1, a foldable stand 102 is shown that includes four panels 104, 106, 108, 110, magnetic tabs 164, 166, 168, 170, handles 122 and 123, and pocket 113. The panels 104, 106, 108, and 110 are flexibly attached together in an open free-standing configuration. The surface exteriors of the four panels 104, 106, 108, and 110 form a generally square-shaped top opening and a generally square-shaped bottom opening. As shown, the bottom opening is larger than the top opening. Lateral surfaces converge to form four sidewall angles (i.e., lateral edges). The lateral surfaces also form generally equal angles relative to a ground surface below, the lateral surfaces tapering from the bottom opening and narrowing to the top opening. Also, the lateral surfaces of the stand are configured to hold or contain a bag within the space defined by the four panels.

For storage, the four panels 104, 106, 108, and 110 bend, or are otherwise adjustable, relative to each other. The lateral edges act like a hinge, allowing the panels to close. In an embodiment, the four panels bend at corner edges 103, 105, 107, and 109 such that the panels 104 and 106 may be folded and lay on top of panels 110 and 108, respectively. Corner edges 105 and 109 may bend in the same direction to fold panels 104 and 110 on top of panels 106 and 108. Thus, with two folding actions, the four panels lay on top of each other for easy storage. The process also may be accomplished by starting with panels 104 and 110 laying flat on panels 106 and 108 by bending at lateral edges 105 and 109, and then bending lateral edges 107 and 103 to fold panels 106 and 104 on panels 108 and 110.

Magnetic tabs 164, 166, 168, and 170 are affixed to upper edges of the stand 102 and are configured to attach upper edges of a garbage bag to the foldable stand. As shown, there is a magnetic tab for each panel. Each tab comprises a short strip that is configured to fold around edges of a garbage bag and secure it to the stand with a magnetic attraction. One end of the strip is secured to the stand and the free end of the strip has a magnetic element. The magnetic element on the free end may be attracted to the frame if the frame includes metallic components. Alternatively, the strip may have two magnetic poles at opposite ends of the strip, allowing the strip to fold over to attach to itself and hold a garbage bag between the magnetic ends. The magnetic attraction is strong enough to go through the material of the panels.

As shown, the tabs are attached to outer surfaces near upper edges of the stand. The tabs may instead be located on edges or on inner surfaces. If the panel comprises two layers, the end of the strip may be sewn within the two layers. Alternatively, the tabs may be located on inner surfaces or squarely on the edges of the panels.

FIG. 1 further illustrates handles 122 and 124 that are centered near top edges of opposing panels 110 and 106 of the stand 202. Instead of the common method of lifting a garbage bag out of a garbage container, the garbage container is lifted off the garbage bag. Because the surface exteriors of the foldable stand are slanted, a common problem that results from suction between the garbage bag and the garbage container is eliminated. Particularly, the angled sides create an increasing volume of space towards the bottom that reduces the surface contact between the outer surface of the garbage bag and the interior surface of the garbage container. Accordingly, pressure that builds up between the garbage bag and the garbage container is reduced with the foldable stand. The foldable stand is quickly and easily separated from the garbage bag simply by lifting the foldable stand vertically upward, or away from, the garbage bag. Other types of bags and other types of uses of the bags are anticipated. For example, smaller versions of the stand may be used in the backseat of cars for holding toys. Larger versions may be used for holding gardening compost, etc.

One or more pockets 113 may be located on the interior or exterior of the stand. As shown, the pocket is centrally located on the exterior surface of panel 106. The pocket may be used to hold extra garbage bags or tools for gardening, etc.

Figure 2:
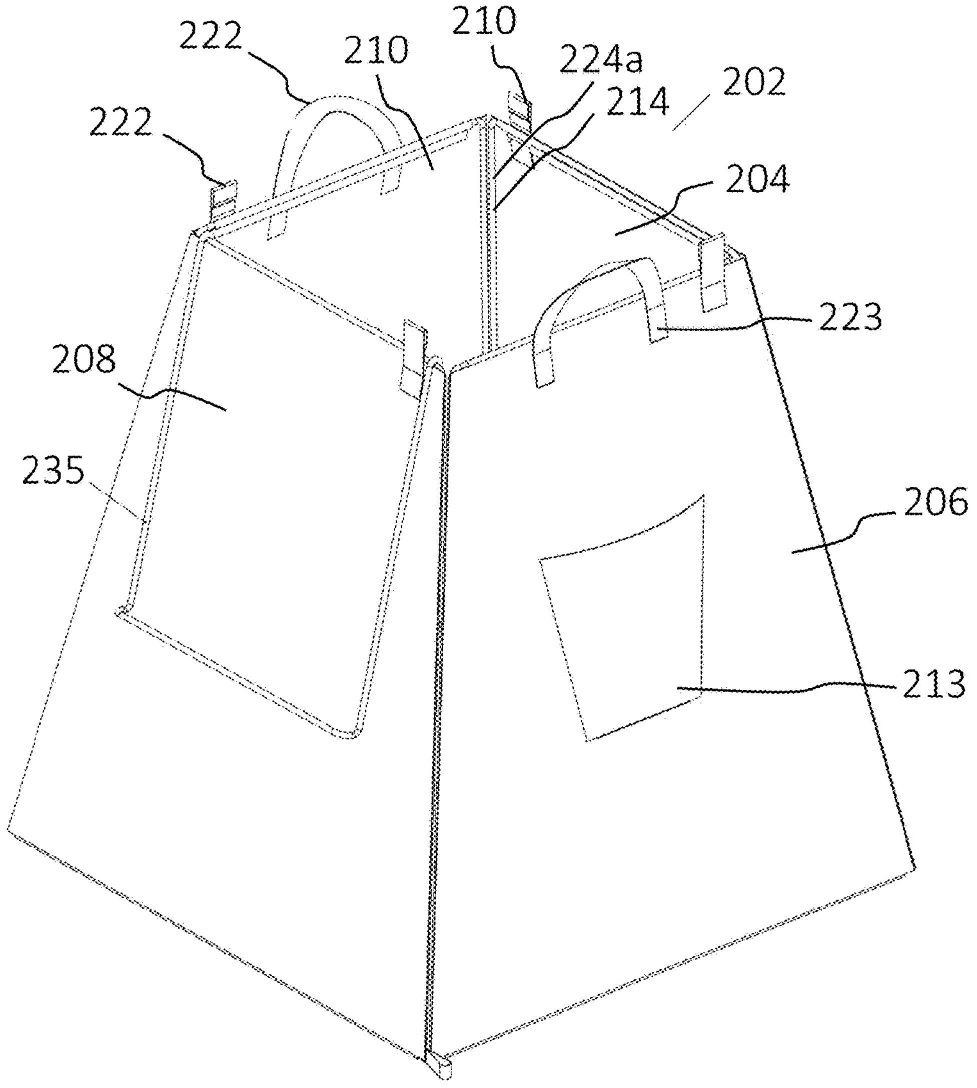
FIG. 2 illustrates a perspective view of a foldable stand.

Turning to FIG. 2, a foldable stand 202 is shown that includes four panels 204, 206, 208, 210, handles 222 and 223, and pocket 213. FIG. 2 further includes an optional squaring brace 235 hanging on a side of the foldable stand and which will be described in greater detail below. The squaring brace 235 is not required, at least in part because of the material that is used and the manner in which it is constructed. For example, material like vinyl is sturdy and can help the frames stay in place to hold up the stand. Additionally, seams that hold the frames together in place also serve to hold up the stand. Other features described herein make it so that a squaring brace is not necessary in all embodiments.

Figure 3:
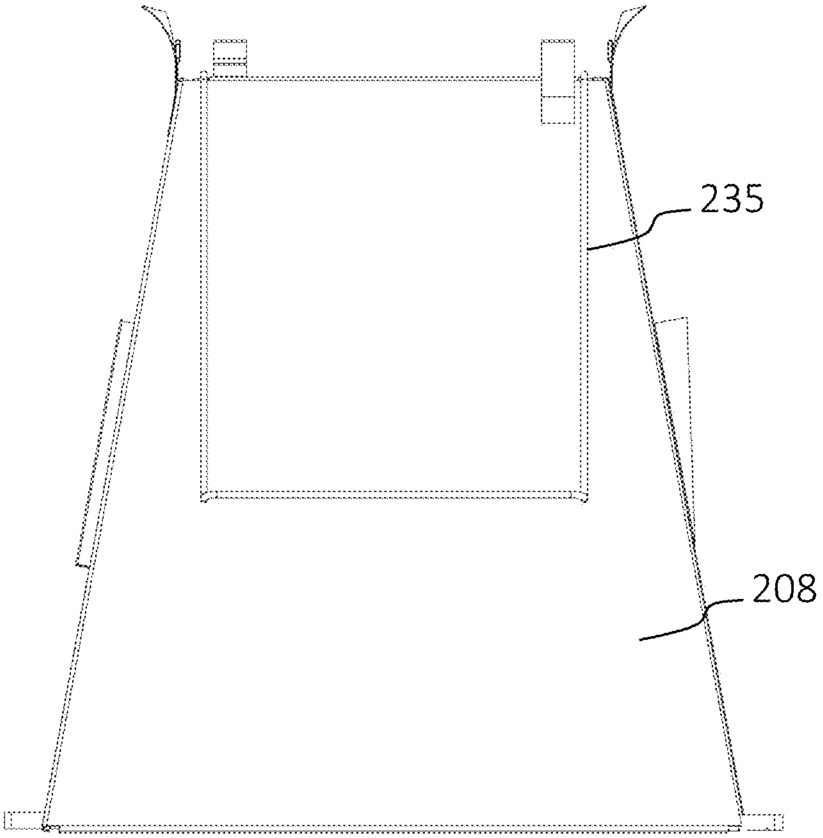
FIG. 3 illustrates a side view of a foldable stand.
Figure 4:
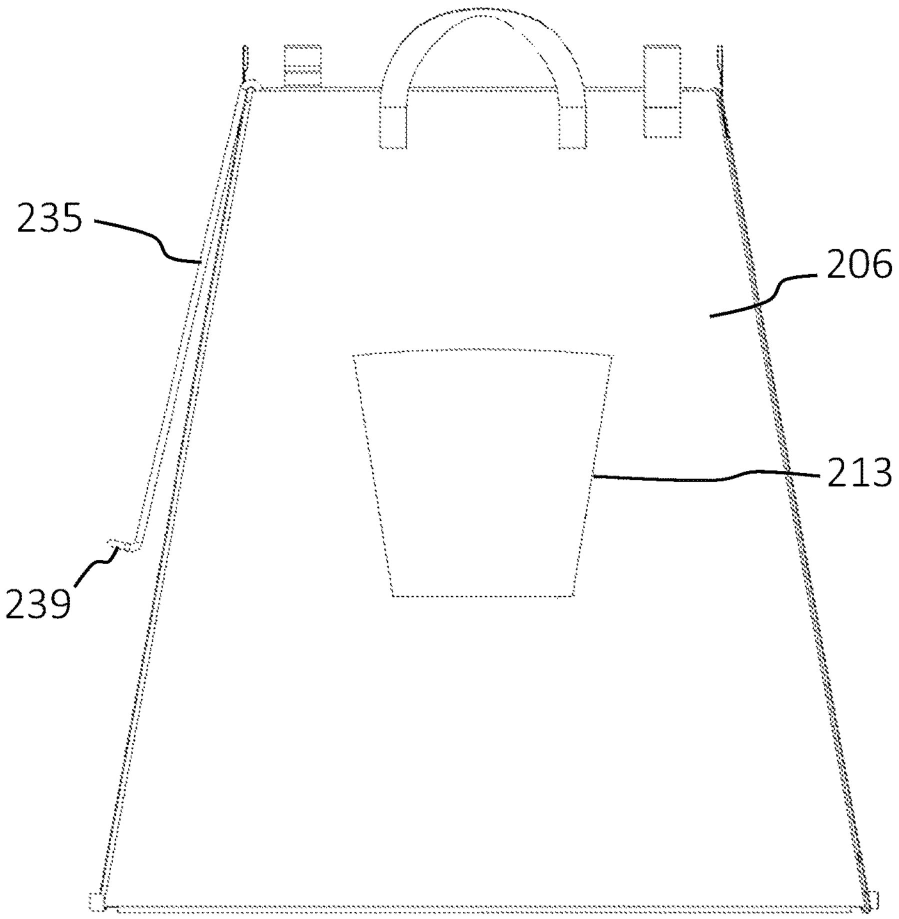
FIG. 4 illustrates a side view of a foldable stand.
Figure 5:
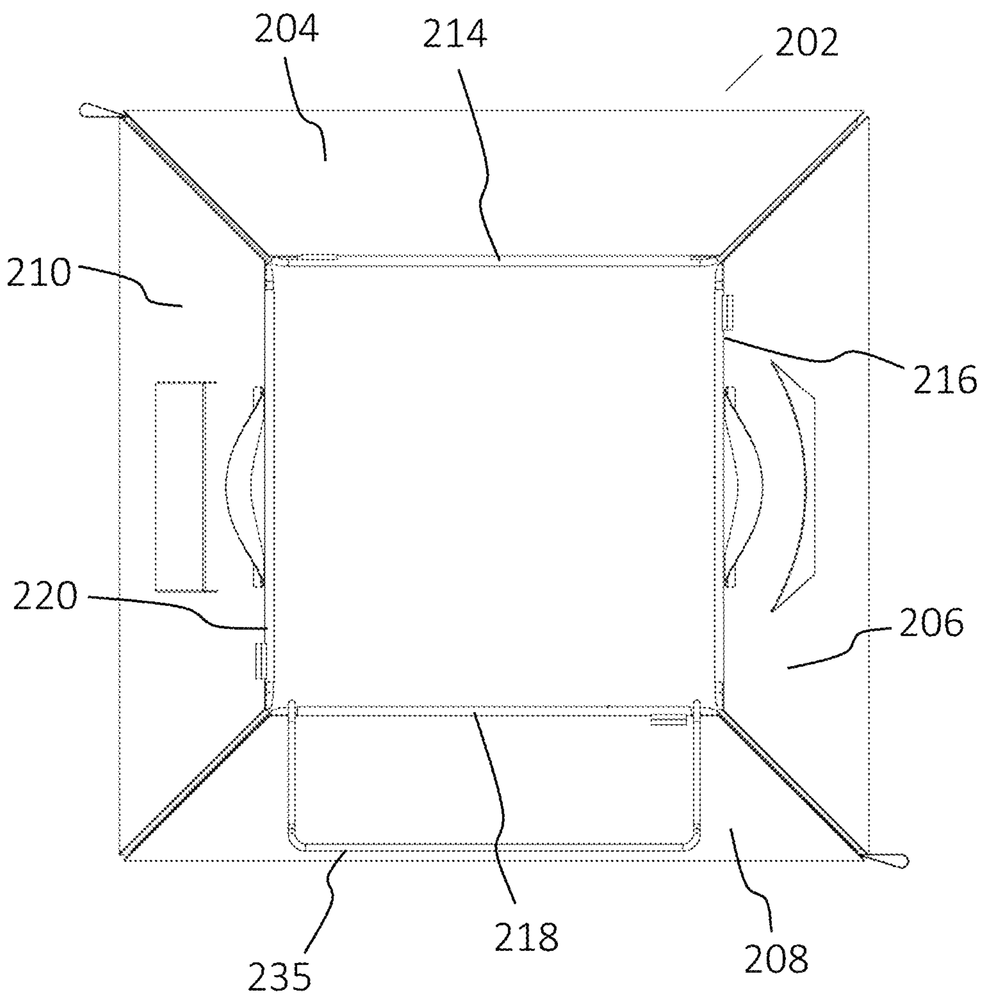
FIG. 5 illustrates a top view of a foldable stand.
Figure 6:
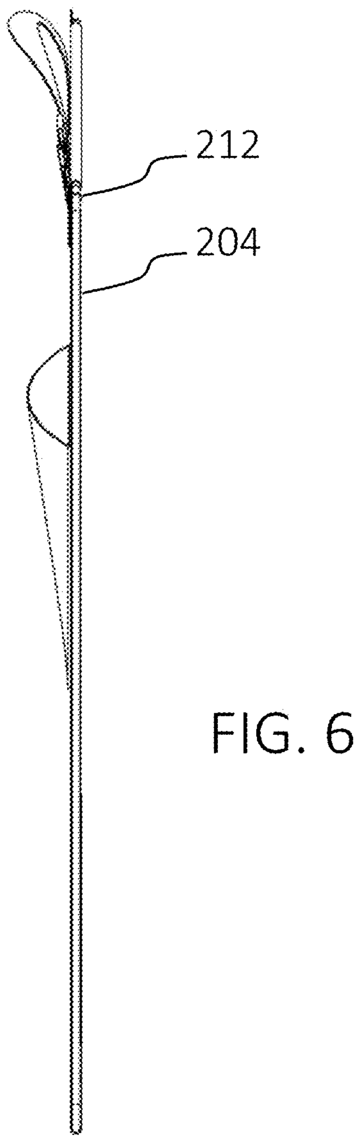
FIG. 6 illustrates a side view of a panel.

Various views of the stand 202 are shown in FIGS. 3, 4, 5, and 6. Particularly, FIG. 3 depicts a side view of the foldable stand including side panel 208 and squaring brace 235. FIG. 4 depicts a side view of the foldable stand including side panel 206, squaring brace 235, grip 239, and pocket 213. FIG. 5 depicts a top view of the foldable stand 202 including panels 204, 206, 208, and 210 with respective frames 214, 216, 218, and 220 that are used to form the panels. FIG. 6 depicts a side view of panel 204 with frame 212.

Figure 7:
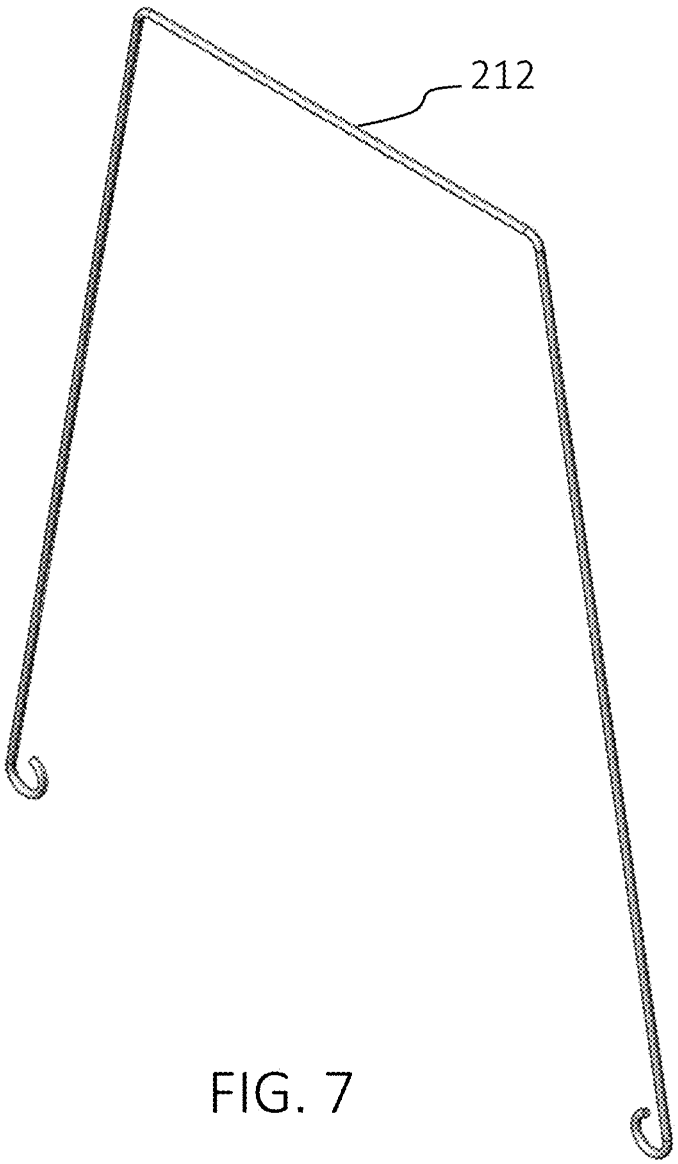
FIG. 7 illustrates a frame.

FIG. 7 illustrates frame 212, which is congruent to the other three frames, the four frames forming a backbone for four congruent panels. Each frame includes an elongated rod that is bent, or curved, in at least two places to form a generally straight middle horizontal portion with two co-planar legs that spread apart such that they are angled away from the horizontal portion as well as each other. Instead of being straight, the two legs may be rounded or sharply bent. Distal free ends of the rod legs of the frame may be straight. Alternatively, the free ends may bend, curve, or curl as shown.

Figure 8:
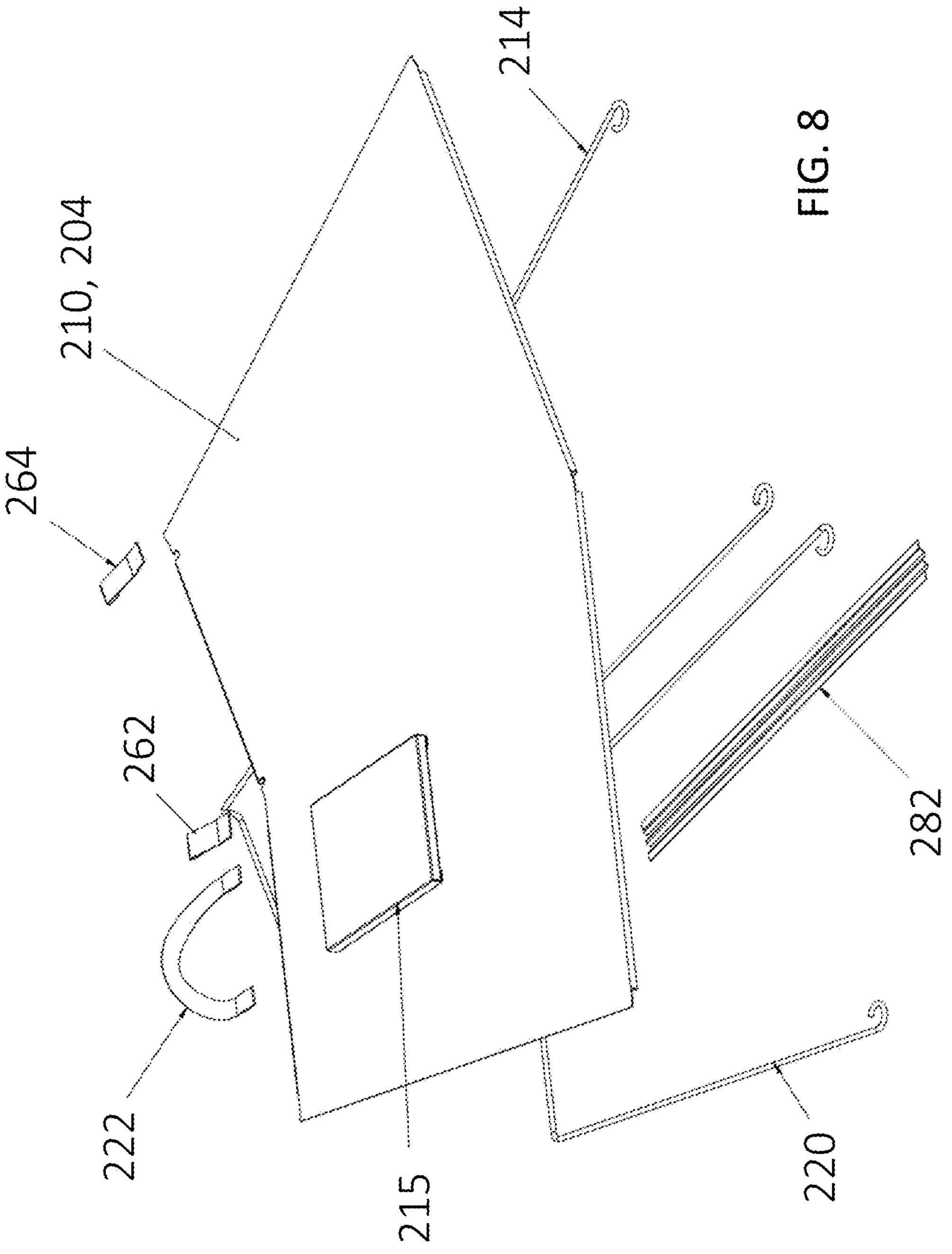
FIG. 8 illustrates pre-assembled components of a foldable stand.
Figure 9:
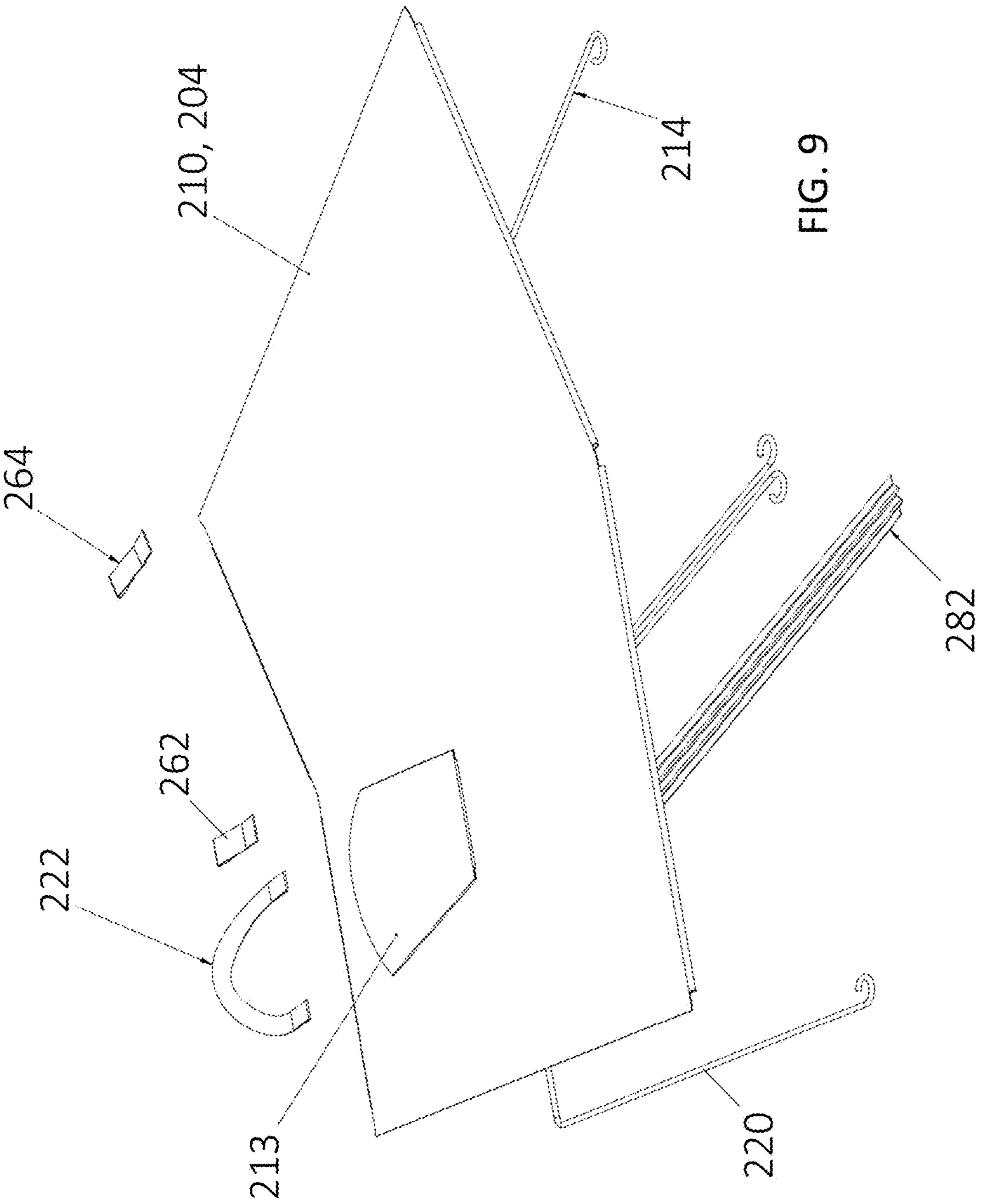
FIG. 9 illustrates pre-assembled components of a foldable stand.
Figure 10:
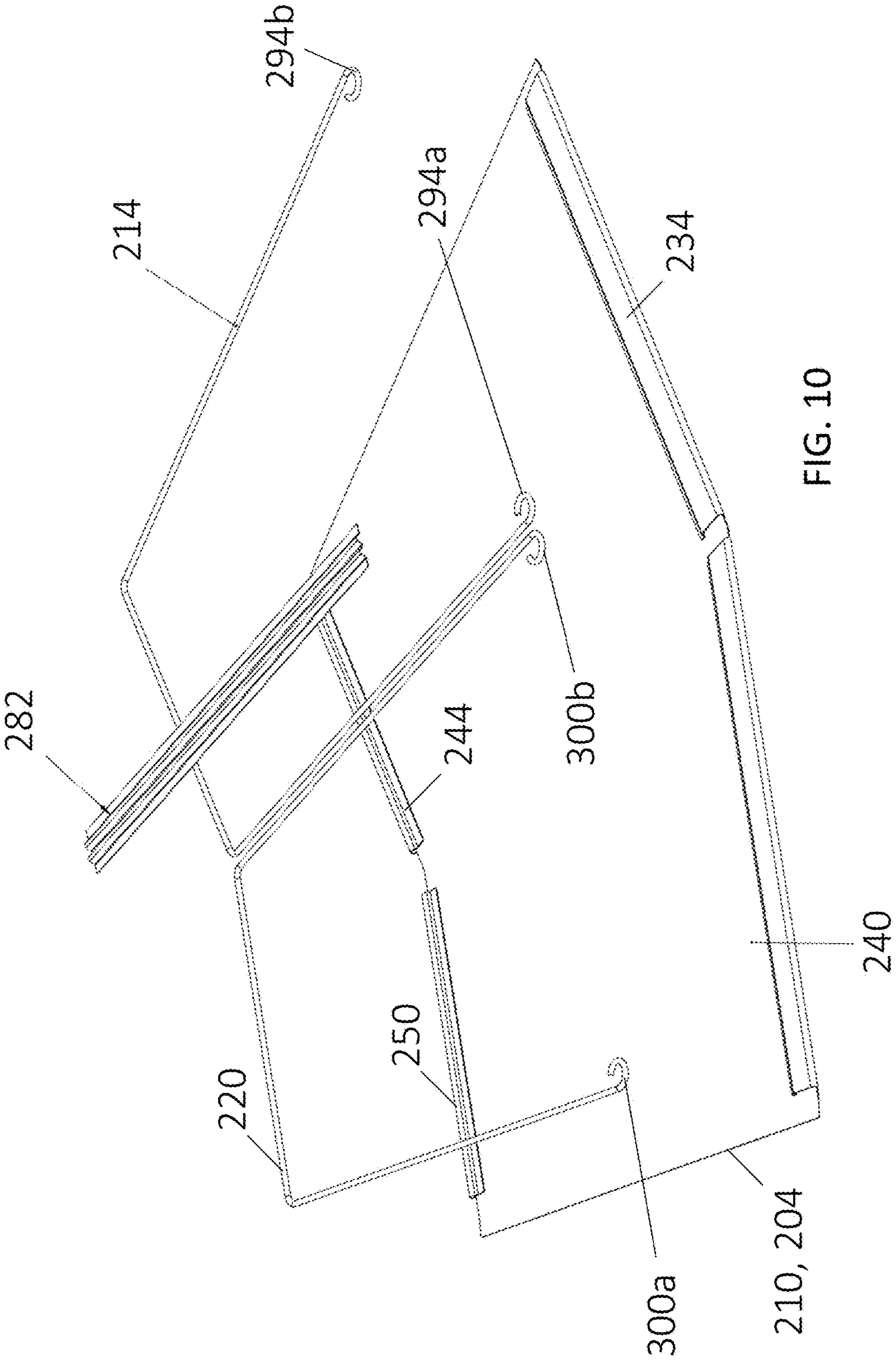
FIG. 10 illustrates pre-assembled components of a foldable stand.
Figure 11:
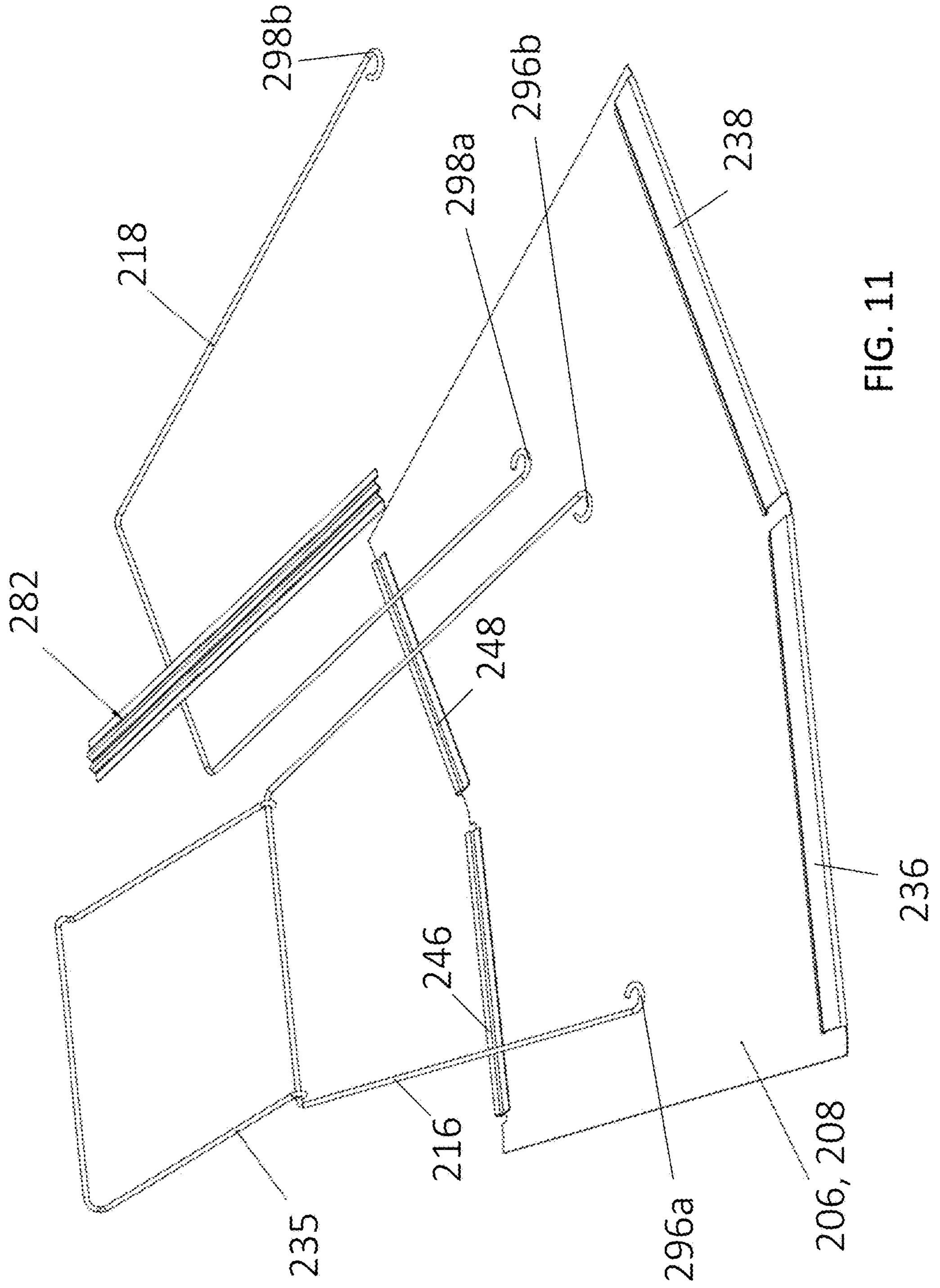
FIG. 11 illustrates pre-assembled components of a foldable stand.

The pre-assembled components of the foldable stand 202 are shown in FIGS. 8, 9, 10, and 11. FIG. 8 includes handle 222, magnetic tabs 262 and 264, panels 210 and 204, pocket 215, frames 220 and 214, and corner cover 282. FIG. 9 includes handle 222, magnetic tabs 262 and 264, panels 210 and 204, square pocket 215, frames 220 and 214, and corner cover 282. FIG. 10 includes frames 220, 214, panels 210 and 204, top material folds 250 and 244, bottom material folds 240 and 234, and corner cover 282. FIG. 11 includes frames 216 and 218, panels 206 and 208, top material folds 246 and 248, bottom material folds 236 and 238, corner cover 282, and squaring brace 235.

Figure 12A:
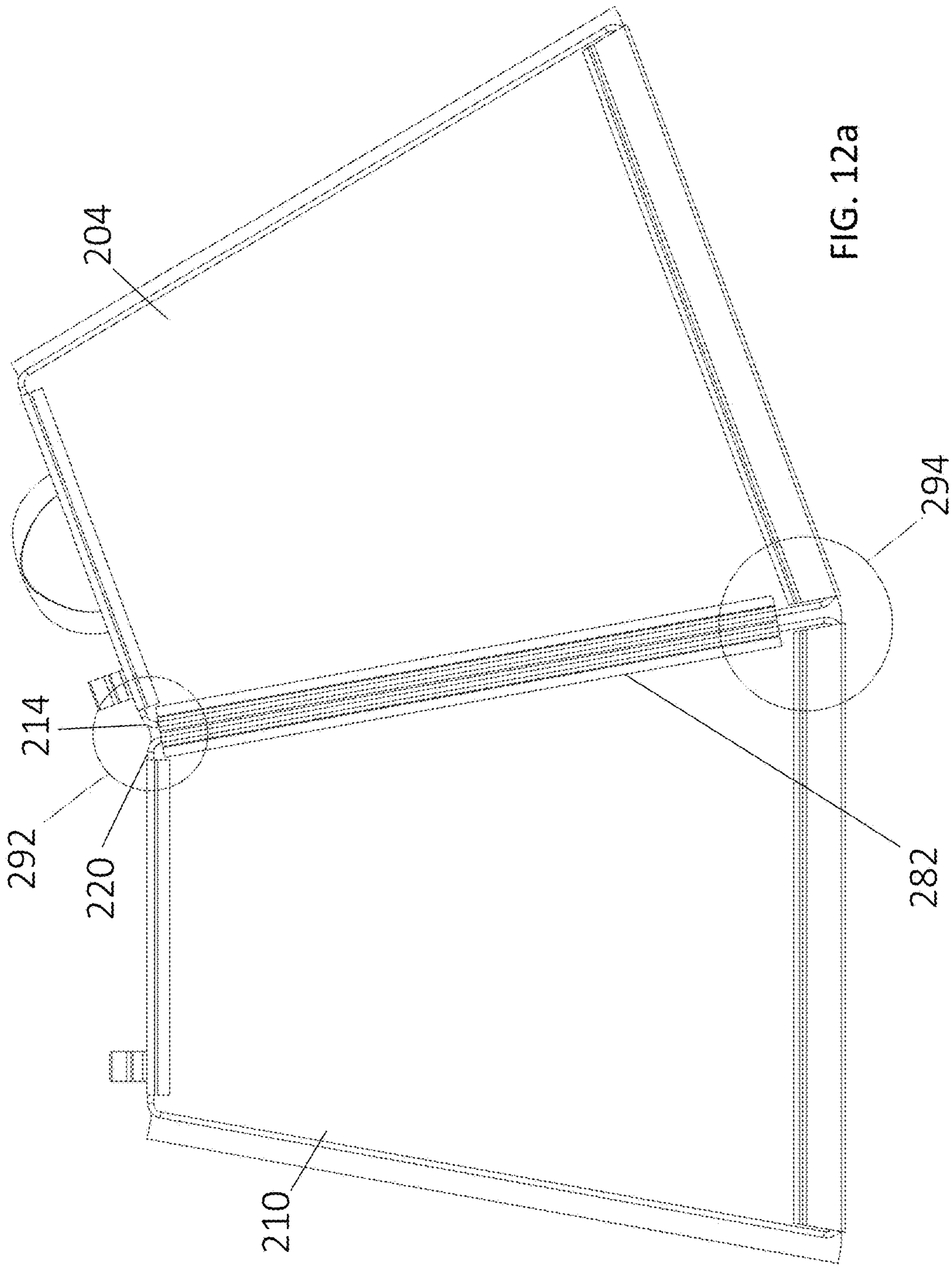
FIG. 12*a* illustrates two panels.
Figure 12B:
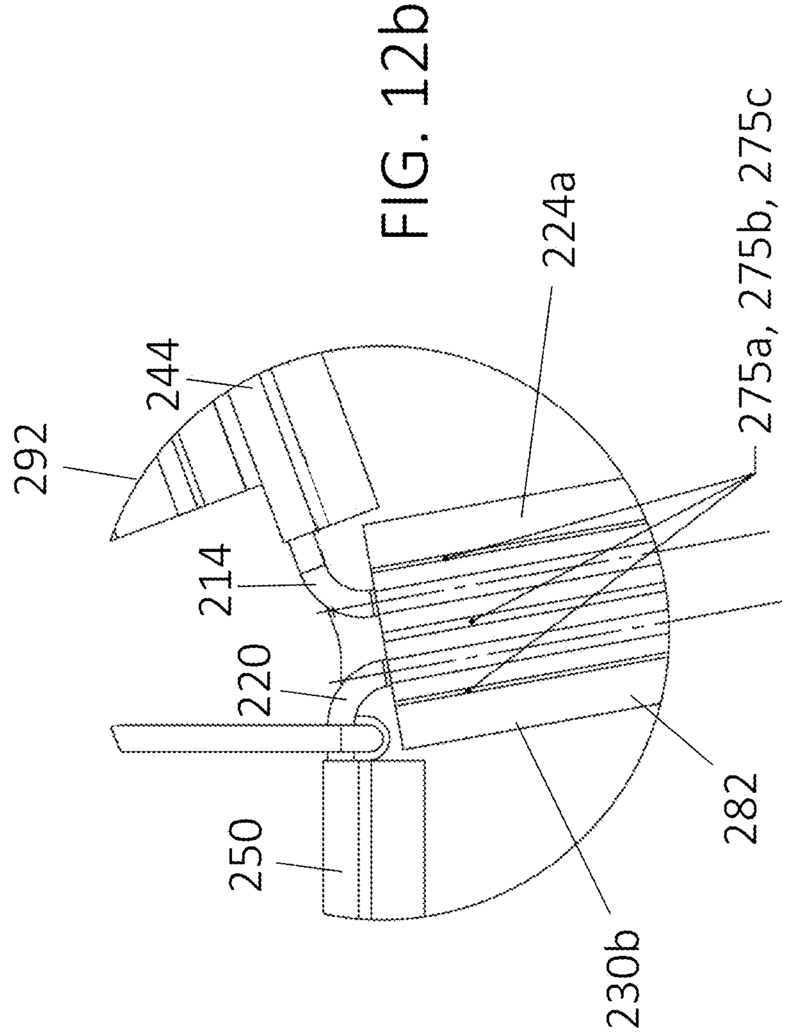
FIG. 12*b* illustrates a detail view of the two panels.
Figure 12C:
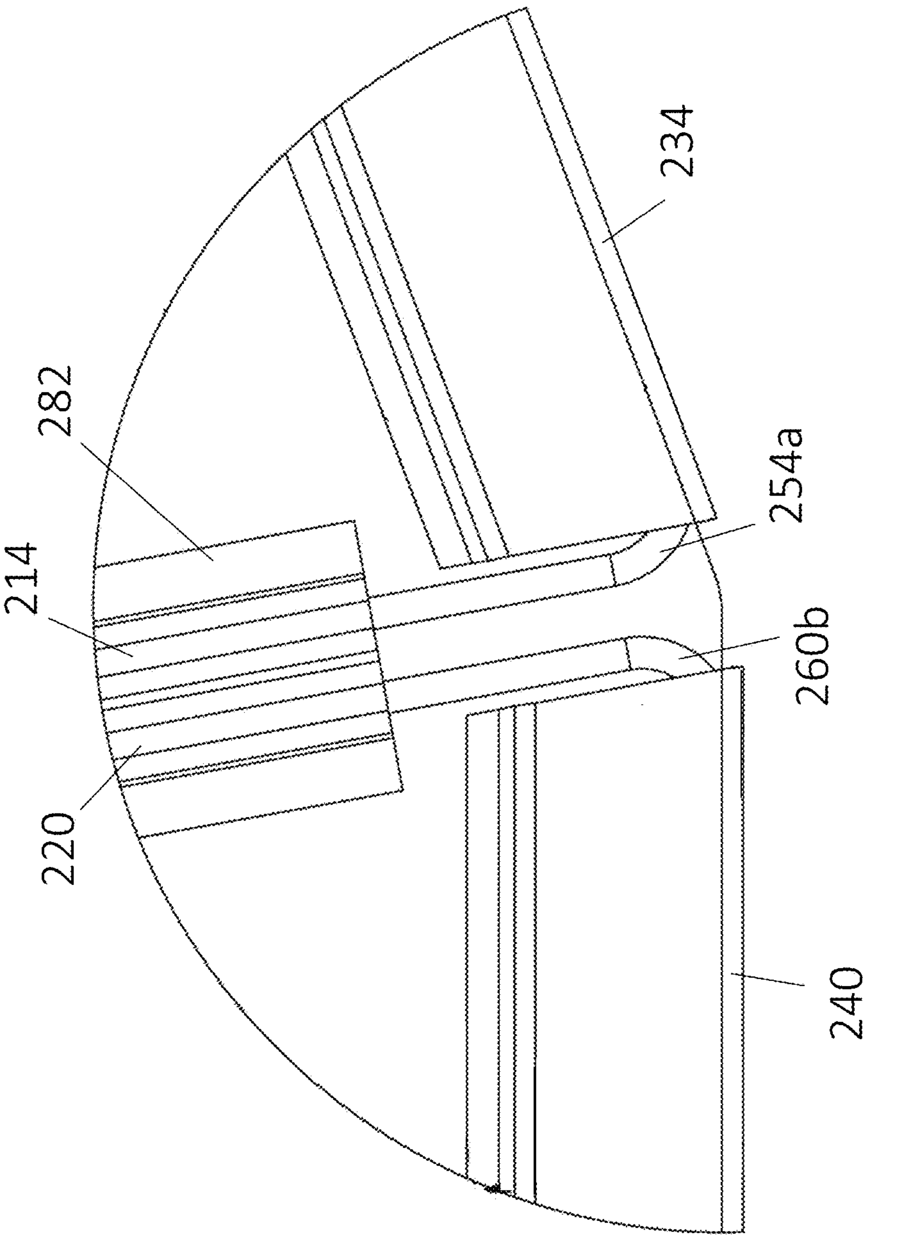
FIG. 12*c* illustrates a detail view of the two panels.

FIGS. 12*a*, 12*b*, and 12*c* show various views of some of the pre-assembled components. FIG. 12*a* shows a cutout of two panels 204 and 210 with two frames 214 and 220 attached. FIG. 12*b* shows a detail view of the top sidewall corner and FIG. 12*c* shows a detail view of the bottom sidewall corner.

Each frame 214 and 220 is partially encased by respective seamed top material folds, or top casings, 244 and 250 as shown in a detail view in FIG. 12*b*. Particularly, top casings 244 and 250 encase top horizontal portions of frames 214 and 220. Free ends of the frames may also be encased in bottom casings, as shown in a detail view in FIG. 12*c*, with free ends 254*a* and 260*b* being encased within bottom folds 234 and 240.

Corner covers may be attached to adjacent panels to cover a pair of legs. As shown in detail view of FIGS. 12*b* and 12*c*, corner cover 282 covers or encases a leg from frame 220 and 214. Attachment seams for attaching the corner cover 282 to panels 210 and 204 include attachment seams 275*a*, 275*b*, and 275*c* running parallel and in between legs 220 and 214, thus forming interior channels within the stand that in which the legs are enclosed, the channels both hiding and protecting the frame legs. Alternatively, the legs may be substantially exposed within the interior of the foldable stand legs, extending generally vertically downward to the bottom of the foldable stand. When exposed, the legs may lightly overlap each other. Alternatively, the legs may be in alignment with each other.

Figure 12D:
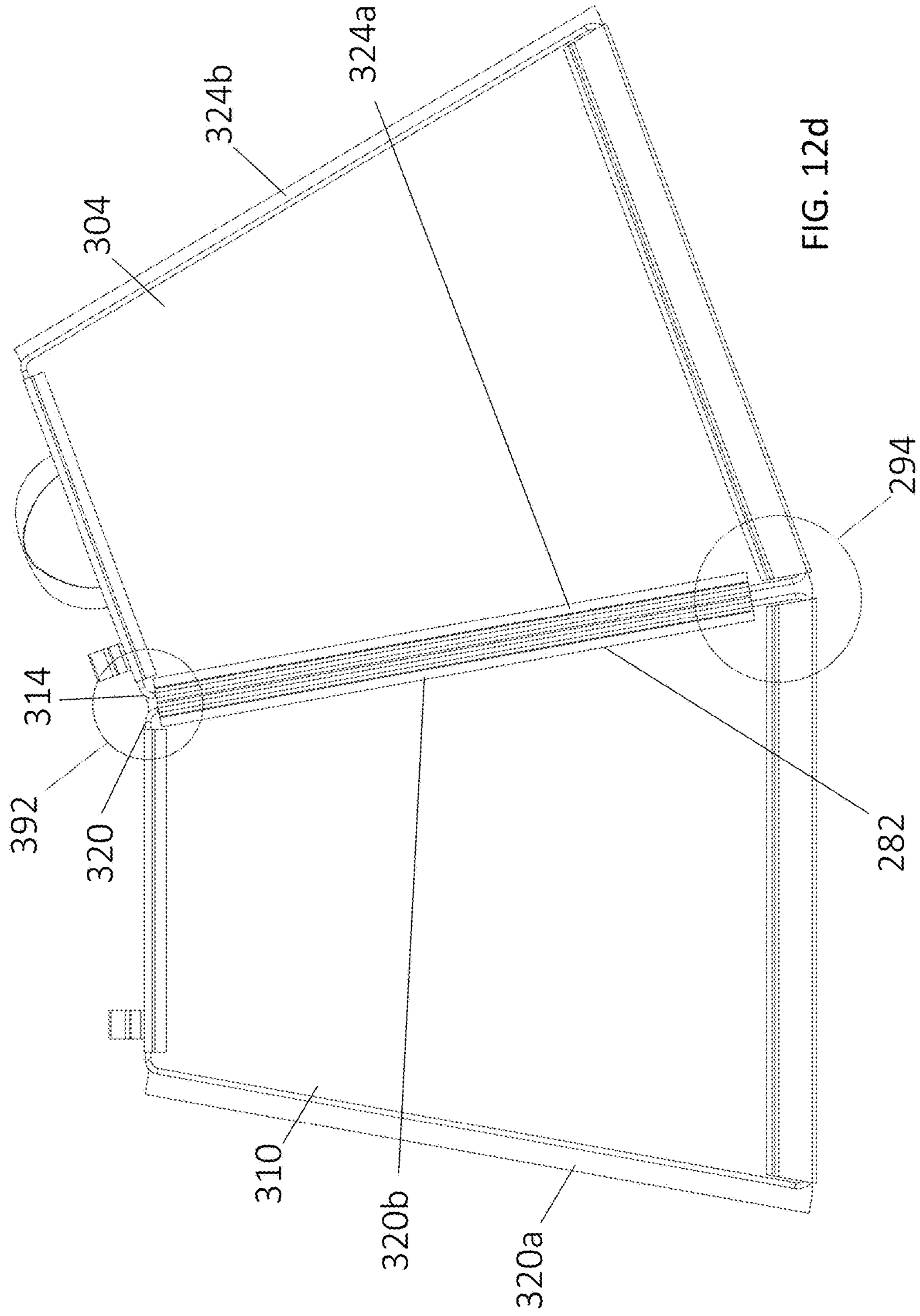
FIG. 12*d* illustrates two panels.

While the cutout in FIGS. 8-11 is shown including material for two panels, a cutout may include material for only one panel. FIG. 12*d* illustrates two separate panels 310 and 304 that are sewn or otherwise attached together. Instead of corner covers, each of the frame legs may be enclosed in respective side casings 320*b* and 324*a*, which are fully sewn down each side. The side casings may be formed by folding over the material near lateral edges and attaching the folded material with one or more seams. Alternatively, each panel may have side casings formed by separate independent coverings that are sewn on to the material. For quick assembly, the legs slide into the side/corner casings 320*b* and 324*a*, or are sewn over the legs, and then the top of the material is sewn over the top middle portion of respective frames 320 and 314. In this manner, the top middle portion of the frame is enclosed within the top casing and the frame legs are enclosed in casings that have been sewn down each side. A variation may include that there be only one casing or fold for the frame covering, with generally little exposure of the frame except for the free distal ends.

Returning to FIG. 2, the squaring brace 235 is shown hanging to one side of the stand 202 not being used. The squaring brace 235 includes an elongated bar that has two bends at its midsection, each bend forming a generally perpendicular corner, free ends of the bar attached to a top of panel 208. The elongated bar may be described as having three arm sections, including a first arm, middle arm, and third arm, each arm forming a right angle with its adjacent arm. The free ends attach to a midsection, or central portion on or near a top of a panel 208. For example, the free ends may curve around the top of the frame 235 as shown in FIG. 9. Other attachments are also possible. The attachment as shown in FIG. 9 allows the brace to pivot about the top of the frame 235 and lay on top of the four panels 204, 206, 208, and 210 such that the panels are held in place.

The squaring brace 235 may optionally include a lip or grip 239 on the middle arm to bend around a respective opposite facing panel (panel 204 in FIG. 5) and thus more securely immobilize the four panels 204, 206, 208, and 208 in a standing configuration with equally angled panels. The grip 239 is structured by ends of the middle arm being curved or bent into a downward facing position such that in the closed position, the brace 235 lays on tops of the four frames with the grip wrapped over the panel that is opposite facing, the arms laying generally on top of and parallel to respective frames, the grip 239 maintaining structural positioning of the panels relative to one another.

The pocket 213 in FIGS. 1 and 2 is an open pocket, meaning the pocket is slightly open at the top. The shape of the pocket may be square or rectangular (FIG. 6). Alternatively, the shape may be or a trapezoid shape as in FIG. 7 with a shorter length on a bottom than a length on top and sides of the pocket angled outward from bottom to top. When being attached to the panel, the sides are sewn with straight square edges so that a pocket with square corner edges is formed and a top opening gapes slightly open due to the longer length toward the top. The sides may be sewn slightly angled as shown in FIG. 7 or straight (not shown).

Figure 13A:
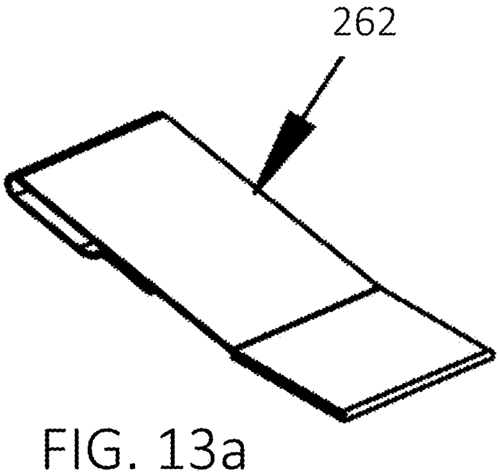
FIG. 13*a* illustrates a magnetic tab.
Figure 13B:
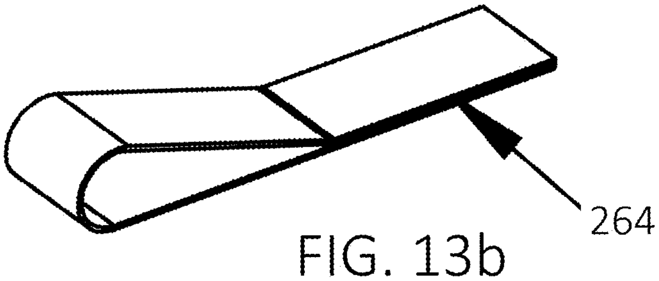
FIG. 13*b* illustrates a magnetic tab.
Figure 33:
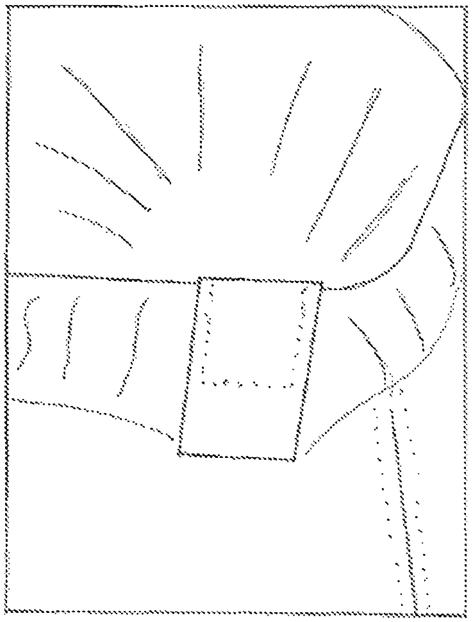
FIG. 33 illustrates a magnetic tab being used to secure a bag.

FIGS. 13*a* and 13*b* show variations of magnetic tabs. (Also see FIG. 33). FIG. 13*a* shows a tab 262 with a magnet at one end. Fabric is folded over and secured at one end with a magnet sandwiched in between the fabric fold. The other end is attached to a panel. The magnetic attraction between the magnetic end and the frame holds the garbage bag at upper edges. FIG. 13*b* shows a tab 264 with a magnet attached at both ends, the ends being attracted to each other to secure ends of a garbage bag to the stand. In either case, the magnet is attached, sewn on, on the outside or inside of the magnetic fabric.

Note that multiple magnetic tabs may be located on each side (i.e. panel) of the stand. The tabs may be made of the same fabric as the panels or may comprise a different composition.

Figure 14:
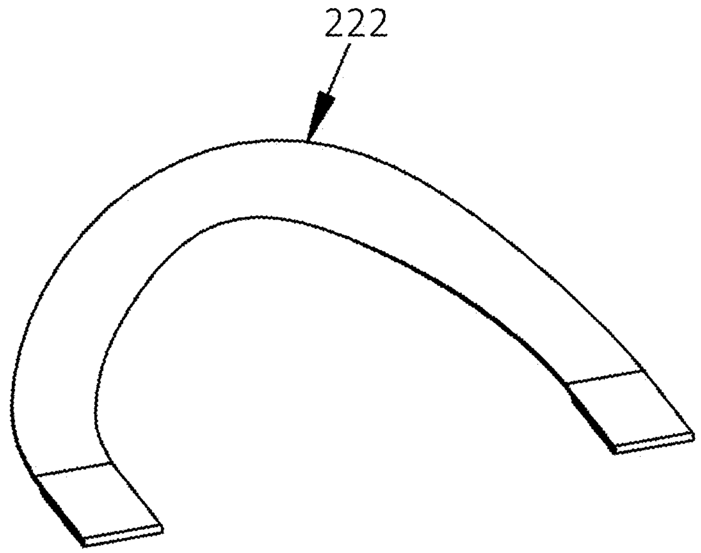
FIG. 14 illustrates a handle.
Figure 15:
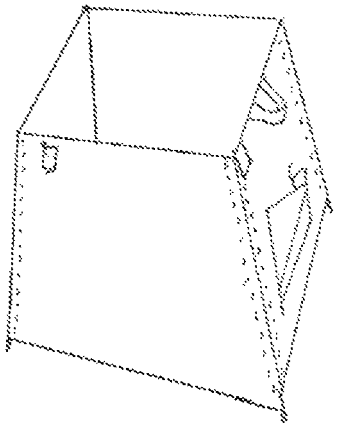
FIG. 15 illustrates a perspective view of a foldable stand.
Figure 16:
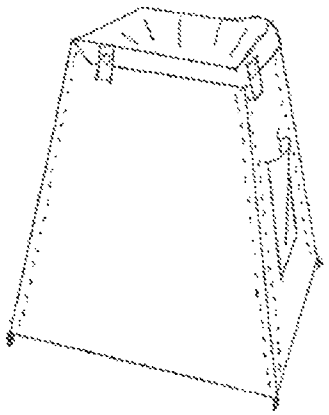
FIG. 16 illustrates a perspective view of a foldable stand holding a bag.

FIG. 14 shows a handle 222. The handle 222 may be made of the same fabric as the panels or may comprise a different composition (e.g., webbed plastic, etc.). The handles are dimensioned and sized for a hand grip of a standard anatomical person commonly used for clothing dimensions.

Figure 17:
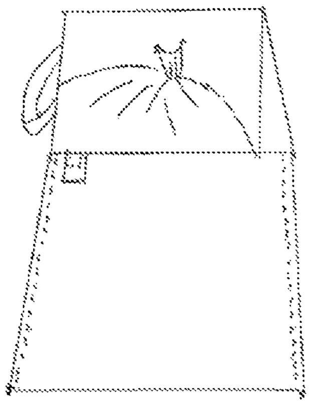
FIG. 17 illustrates a perspective view of a foldable stand for holding a bag with a bag inside the stand.
Figure 18:
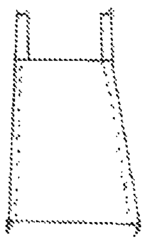
FIG. 18 illustrates a perspective view of a foldable stand being removed from a bag.
Figure 19:
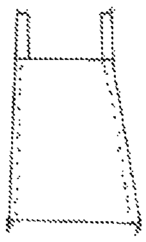
FIG. 19 illustrates a perspective view of a foldable stand removed from a bag.
Figure 20:
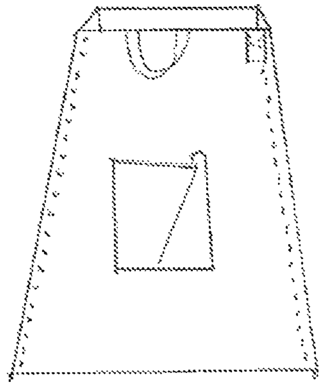
FIG. 20 illustrates a side view of a foldable stand.
Figure 21:
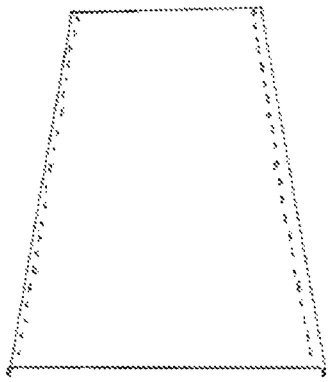
FIG. 21 illustrates a side view of a foldable stand.

FIGS. 15-29 illustrate actual photographs of the stand. Particularly, FIGS. 17-19 illustrate the manner in which the foldable stand is removed from the garbage bag.

Figure 22:
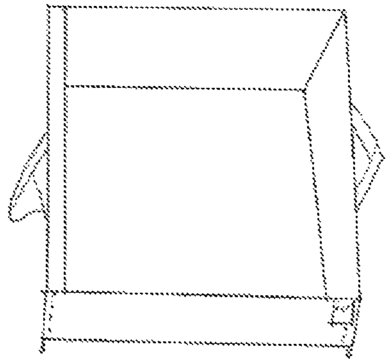
FIG. 22 illustrates a top view of a foldable stand.
Figure 23:
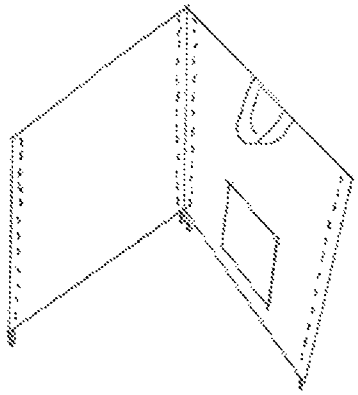
FIG. 23 illustrates a perspective view of a foldable stand.

In FIGS. 22-25, the collapsible nature of the foldable stand is shown. FIG. 22 shows the foldable stand prior to being collapsed. The foldable stand is stable, having four supports located at the corners. The foldable stand is also lightweight, comprising panels that may be made of a lightweight material. FIG. 23 shows the foldable stand after two pairs of surface exteriors are folded such that their respective interior surfaces are touching, or in other words, such that each pair of surface exteriors are flat upon each other. The folds occur along lateral edges of the exterior surfaces.

Figure 24:
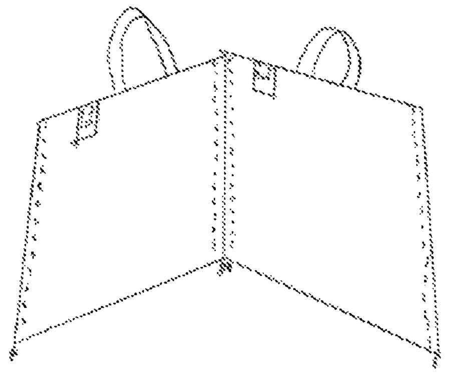
FIG. 24 illustrates a perspective view of a foldable stand.
Figure 25:
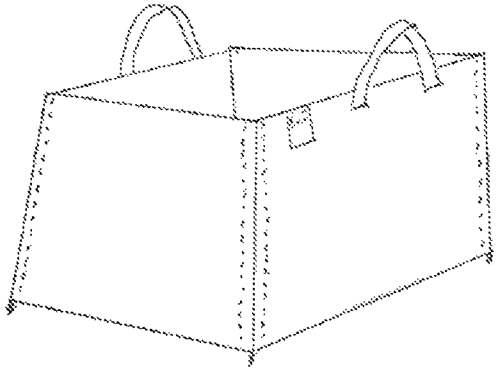
FIG. 25 illustrates a perspective view of a foldable stand.
Figure 26:
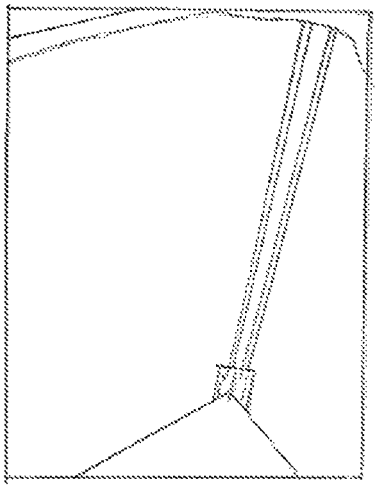
FIG. 26 illustrates a perspective view of a region of a foldable stand.
Figure 27:
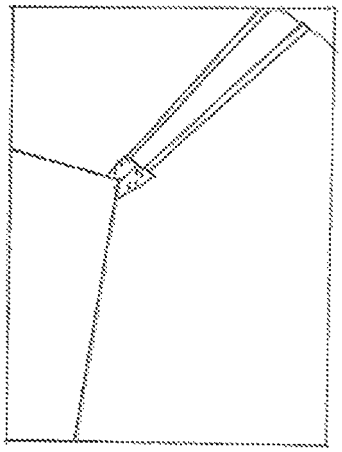
FIG. 27 illustrates a perspective view of a region of a foldable stand.
Figure 32:
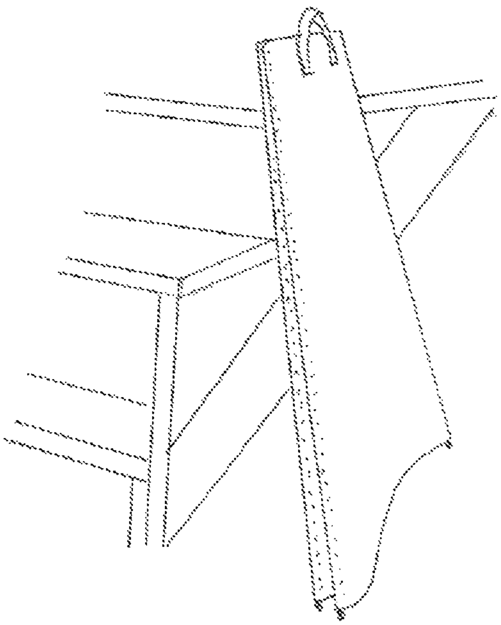
FIG. 32 illustrates a perspective view of foldable stand in a closed position.
Figure 34:
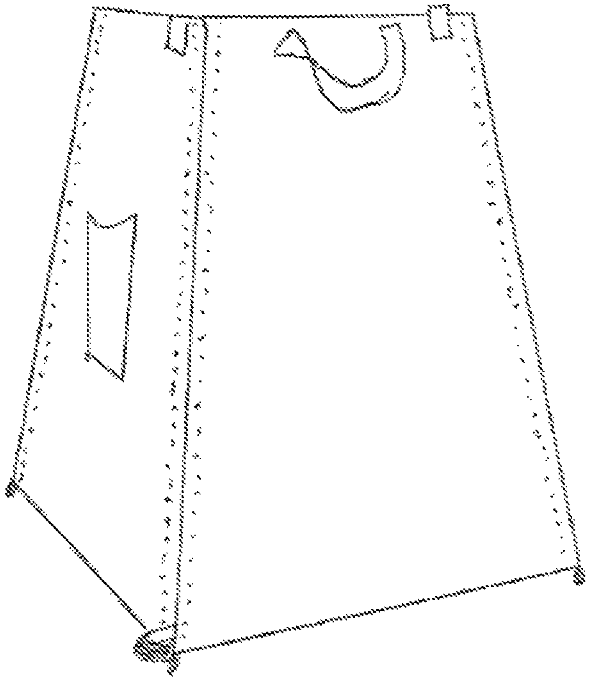
FIG. 34 illustrates a perspective view of a foldable stand in an open position.

In FIGS. 24 and 25, a folded and unfolded foldable stand is shown, respectively. Also see FIGS. 32 and 34. Handles are located on opposite sides of the foldable stand and are used to perform actions of folding and unfolding the foldable stand. FIGS. 26 and 27 each show an interior corner of the foldable stand. Each interior corner is formed by two panels that are positioned perpendicular to each other. Note that the panels may be separate from each other or that the panels may be formed from a continuous material.

Figure 28:
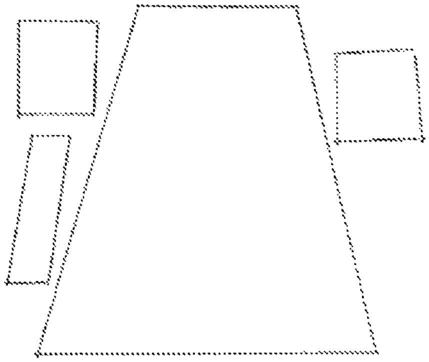
FIG. 28 illustrates a pattern for making panels for a foldable stand.
Figure 29:
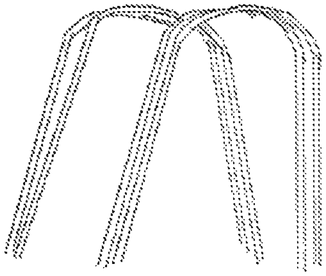
FIG. 29 illustrates four U-shaped frames.

FIG. 28 shows an embodiment of a pattern for manufacturing a foldable stand. The pattern may include a tracing for a pleated pocket, a handle, a patch pocket, a magnetic attachment, and a panel. As shown, dotted lines indicate seams that are made. Side seams at lateral ends of each panel are made to form the four-sided surface exteriors. The seams are straight and simple, which allow for efficient manufacturing. The top seams create channels with openings in which the frames are enclosed and thus removably secured to the foldable stand. The top seam has an opening at each end in which the central portion may be located with the legs bending vertically downward. Bottom seams create an opening in which the distal ends of the frames are removably secured to form corner ends of the foldable stand.

Figure 30:
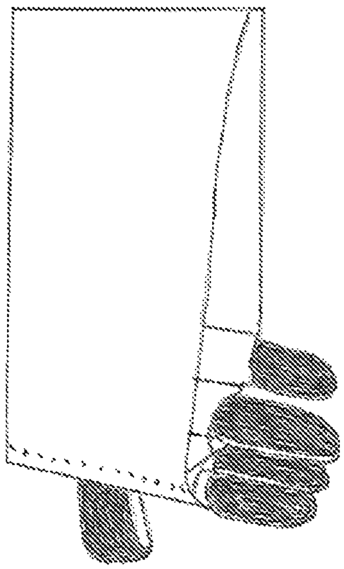
FIG. 30 illustrates leg end covers.
Figure 31:
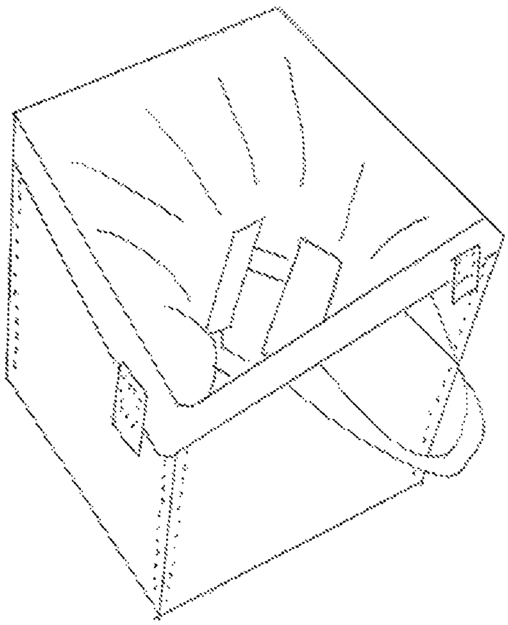
FIG. 31 illustrates a perspective view of a foldable stand.

The distal free ends may further include protective coverings that protect the ends from exposure as seen in FIG. 30. The covering 249 in FIG. 30 is for a leg end with a straight free end. Coverings may be provided for any kind of end, whether it be straight or curved. The protective covering is form-fitting and extends at least partially upward along the distal end so as to prevent surface contact of the corner ends with a ground surface. The fit may be friction fit. The material of the covering includes any material listed herein. Additionally, the coverings may include elastic or other stretchy material that provides for a tight fit. Ties, snaps, buttons, adhesive, Velcro, or other elements may be used to ensure a tight closure. A molded protective plastic and/or rubber material may be molded onto the free ends.

Figure 35:
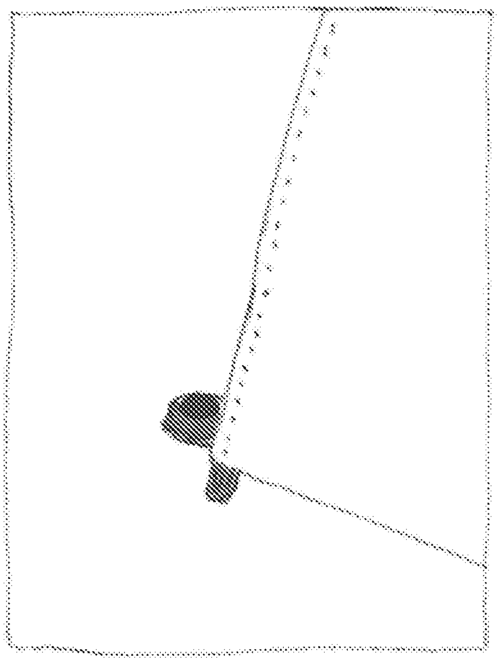
FIG. 35 illustrates a stake loop on a foldable stand.

To secure the end to a ground surface, stake loops may be provided. FIG. 35 shows an exemplary stake loop 259 secured at or near the bottom of the stand. At least one stake loop may be located at bottom corners of the stand where lateral base edges of the panels intersect. The stake loop 259 includes a strip that is attached at ends to the stand, forming a loop that can be used to attached the stand to a ground surface. As shown, the strip is sewn or otherwise attached in between lateral edges of two panels to thereby secure the stand at corners where the legs are located.

The fabric of the panels may vary. For example, types of fabric include one or more of cloth, plastic, vinyl, vinyl with fabric on the interior, UV resistant material, netted material, or a combination thereof. The fabric may be flexible or not flexible. Fabric may be selected such that edges are not needed to be sewn before sewing a seam (e.g. vinyl with fabric on the interior surface). The materials for frames and the squaring brace may be the same. Also, a diameter section of the frame may be equal to a diameter section of the squaring brace.

Embodiments include that the foldable stand include actual hinges on every corner, approximately ⅓ to ½ the way down corner edges. More than one hinge on a corner may be used. Actual hinges may be made of metal, plastic, fabric, a combination thereof, or other material.

The foldable stand may be considerably lightweight given that the walls are mostly fabric. Exemplary non-limiting dimensions include a height of approximately 27 inches and a 25 square inch base, with the foldable stand being less than 3 lbs. Exemplary non-limiting heights may vary from 30 inches, 29 inches, 28 inches, 27 inches, 26 inches, 25 inches, 24 inches, 23 inches, and less. Miniature containers may also be used and include heights less than 12 inches. Exemplary non-limiting bags used for the containers may be 32-39 gallon size, or even up to 42 gallon size. For miniature containers, small bags dimensioned to fit within the miniature container may be used.

Shapes of the foldable stand may vary, for example, and may be a triangle, rectangle, hexagonal, etc. The number of frames and panels vary accordingly to define the given shape (e.g. three frames and three panels for a triangle shape, etc.).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A foldable stand comprising:

four panels attached flexibly at lateral edges such that the panels can be folded in a closed configuration flat upon each other or alternately folded into an open configuration to form a self-supporting free-standing stand, the free-standing stand with the panels forming lateral surfaces and the stand having a top opening formed by tops of the panels and a bottom opening formed by bottoms of the panels, the tops and bottoms of the panels dimensioned such that the bottom opening is larger than the top opening with the lateral surfaces of the stand tapered from the bottom opening narrowing to the top opening;

at least one frame attached to one of the panels and supporting the panel, the frame comprising:

a central portion, a bent, or curved, portion at either end of the central portion, two leg portions extending outward from either end of the bent portion, the central portion attached at the top of the panel, the leg portions extending toward the bottom of the panel along the lateral edges, and free ends of the leg portions attached at base corners of the panel.

2. The stand of claim 1, further comprising flexible fabric material that extends across flexibly lateral edges between panels such that the panels are flexibly attached at lateral edges.

3. The stand of claim 1, further comprising a top fold along the top of the panel through which the central portion of the frame is enclosed thereby attaching the frame to the panel at top.

4. The stand of claim 3, further comprising a corner cover that includes a strip of material that is configured to attach to lateral edges of adjacent panels and thereby cover and protect adjacent leg portions of frames at lateral edges.

5. The stand of claim 1, further comprising a corner base channel at each corner of the panel through which the ends of the two leg portions of the frame may be inserted, thereby attaching each frame to the panel at bottom.

6. The stand of claim 1, wherein the two legs of the frame include free ends that are straight.

7. The stand of claim 1, wherein the four panels are formed as separate panels and attached together at lateral edges to form the free-standing stand.

8. The stand of claim 1, wherein the panels are seamed at top, bottom, and lateral edges.

9. The stand of claim 1, further comprising a squaring brace, the brace comprising:

three generally straight elongated arms including a first arm, a middle arm, and a third arm, each arm forming a right angle with an adjacent arm, free ends that wrap around a central portion of one of the frames, the stand having an open position where the brace hangs from a side of the stand and a closed position where the brace lays on the tops of the four frames.

10. The stand of claim 9, wherein a grip is formed by ends of the middle arm being curved into a downward facing position such that in the closed position, the brace lays on the tops of the four frames with the grip wrapped over the frame that is opposite facing, the grip maintaining structural positioning of the panels relative to one another.

11. The stand of claim 1, further comprising handles that are located on opposite sides of the stand, the handles being centrally located on opposite facing panels.

12. The stand of claim 1, further comprising a plurality of magnetic tabs, each tab including a strip that includes a loop, a banded member that extends from the loop, and a magnet attached within the loop and within the banded member, the banded member attached on an outer facing surface near or at a top of one of the panels, the tab configured to fold over the top of the panel, over a bag, and attach to the magnet within the loop and thus securely clamp edges of the bag.

13. The stand of claim 1, further comprising at least one pocket located on an outer surface of one of the panels, the pocket having a trapezoid shape, a shorter length on a bottom than a top length, sides of the pocket being attached with sides having straight square edges so that a pocket with square corner edges is formed and a top opening gapes slightly open.

14. The stand of claim 1, further comprising loops located at one or more base corners, the loops configured to allow stakes to be driven through the loops and into the ground and thus hold base corners of the stand in place.

15. The stand of claim 1, further including protector fittings that attach to free ends of the two leg portions.

* * * * *